FERROMAGNETIC MEMORY UNIT

Filed March 28, 1961

INVENTORS.
JACOB TELLERMAN
ROBERT J. LAIRD
BY
Raymond A. Paquin
ATTORNEY.

3,212,069
Patented Oct. 12, 1965

3,212,069

FERROMAGNETIC MEMORY UNIT

Jacob Tellerman, Oakland Gardens, and Robert J. Laird, Valley Stream, N.Y., assignors to American Bosch Arma Corporation, a corporation of New York Filed Mar. 28, 1961, Ser. No. 98,558
5 Claims. (Cl. 340—174)

The present invention relates to magnetic memory devices and has particular reference to magnetostrictive memories.

The unit of this device uses the Wertheim and inverse Wiedemann effects as the basis of its operation. The Wertheim effect is the production of a voltage across the ends of a wire when it is twisted in a longitudinal magnetic field. The inverse Wiedemann effect is the axial magnetization of a wire when it is twisted and a current is passed through the wire at the same time. The memory device of this invention uses the inverse Wiedemann effect to store digital information on a magnetostrictive wire and the Wertheim effect to read out the stored information.

In the preferred embodiment of this invention, a torsion transducer, which converts electrical energy pulses into mechanical torsional pulses, is attached to one end of a ferromagnetic wire which stores the digital information. To write into the device the torsional pulses are propagated down the wire in response to electrical pulses applied to the torsional transducer. When all the pulses are in the wire, an electrical current pulse is transmitted through the wire. Coincidence of each stress pulse with the current pulse produces an axial magnetization of the wire at the position of each stress.

Readout is accomplished by the Wertheim effect where the locally magnetized areas act to produce a voltage across the ends of the wire whenever that portion of the wire is twisted. Thus, a torsional pulse is initiated at one end of the wire and as it travels down the wire a voltage pulse is produced across the ends of the wire each time a magnetized portion of the wire is passed. The train of pulses represents the digital number which had been stored on the wire.

It is an object of this invention to use the inverse Wiedemann effect to "write" onto a magnetrostrictive storage media.

It is another object of this invention to use the Wertheim effect to "read out" from a magnetostrictive storage media.

It is an object of this invention to use both the inverse Wiedemann effect and Wertheim effect in magnetostrictive storage devices.

For a more complete understanding of this invention, reference may be had to the accompanying diagrams in which.

Figures 1, 2:
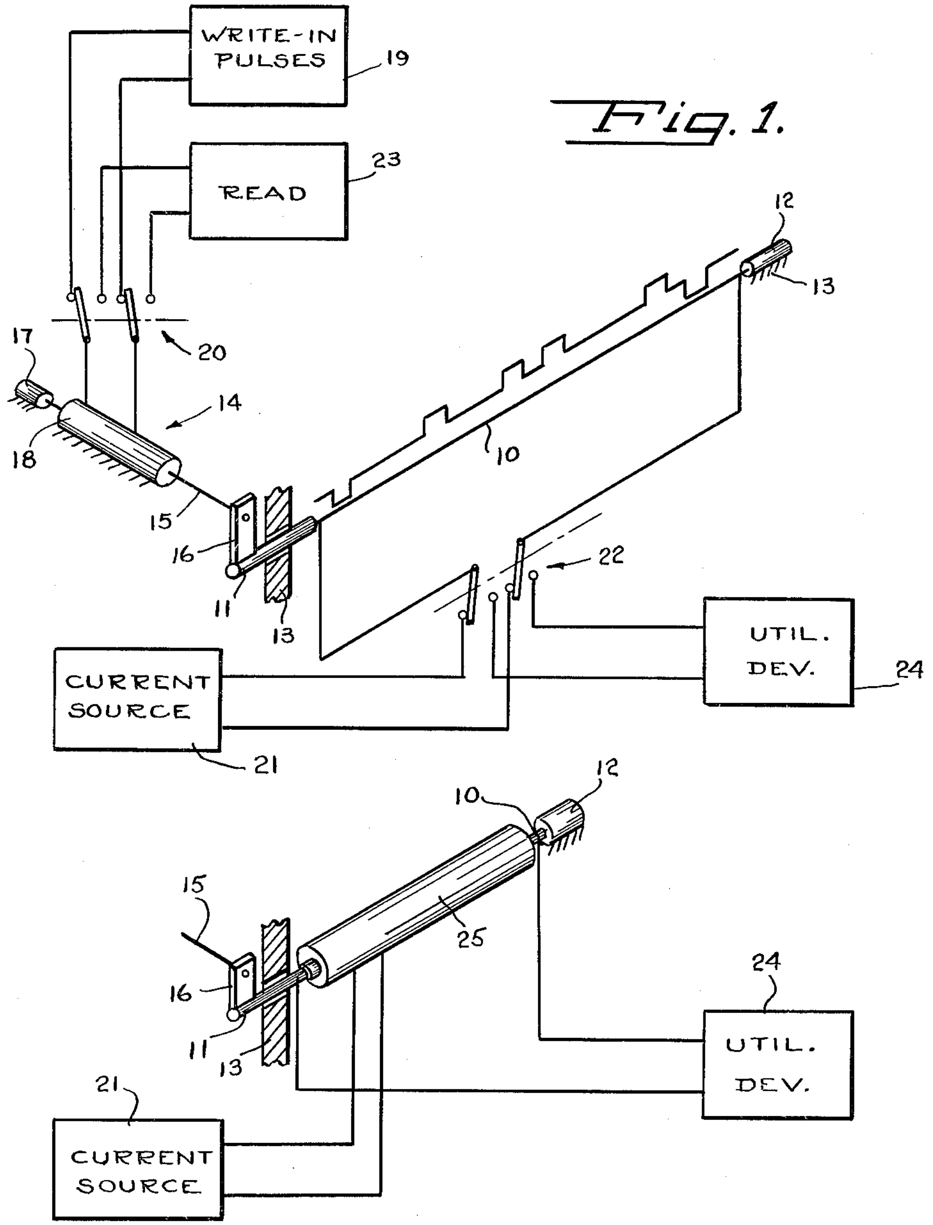
FIGURE 1 shows one embodiment of the present invention.
FIGURE 2 shows a modification of the embodiment of FIGURE 1.

With reference now to FIGURE 1 of the drawings, there is shown a ferromagnetic wire 10 stretched between a torsion bar 11 and a mechanical damp device 12, both supported by a frame 13. The torsion bar 11 is actuated by a torsional transducer 14 which includes, for example, a magnetostrictive bar 15 attached at one end to an arm 16 on the bar 11 and to a mechanical damp 17 at the other end. A coil 18 surrounds the bar 15 and is supported by the frame 13 as in the damp 17. Energization of the coil 18 causes contraction (or expansion) of the magnetostrictive member 15 thereby applying a twist to the wire 10 through the torsion bar 11. The bar 11 must be free to rotate about its longitudinal axis and is supported in any desirable fashion which will permit this action. FIGURE 1 shows the bar 11 as a shaft journaled in a bearing, but spring type supports can be used as well if desired.

A series of pulses representing a digital number, is applied to coil 18 from the write-in signal source 19 through switch 20 whereby the pulses appear as torsional stress impulses at one end of the wire 10 and are propagated down the wire 10 at a constant rate. Thus, if the digital number 100110100 appears in the form of electrical pulses at source 19, a series of stress pulses as indicated on FIGURE 1 will travel along the length of the wire 10, with the highest order digit found on the right of the wire 10. The beginning and end of the digital number are marked by reference pulses which are applied to the coil 18 and are shown as the reverse pulses opposite the wire 10 to distinguish from the number pulses. The reference pulse need not be a reverse pulse but any type of identifying pulse will be acceptable. After the stress pulses are applied to the wire 10, a current pulse is transmitted through the wire 10 from current source 21 and through the switch 22. The coincidence of the current pulse in wire 10 and each stress pulse cooperates to produce an axially magnetized section of the wire 10 at the exact position of the stress pulse, thereby storing the digital number in the form of discretely spaced magnetized areas along the length of the wire 10. The current pulse effectively "freezes" the position of the stress pulses along the wire as localized axially magnetized portions.

In order to read out the stored number, another torsional pulse is sent down the wire and a voltage pulse appears across the ends of the wire 10 each time the stress pulse passes a magnetized area. Thus, the read pulse from source 23 is used to energize the coil 18 through switch 20 and a serialized digital indication of voltage impulses across wire 10 is applied to the utilization device 24 through switch 22. Switches 20 and 22 are operated simultaneously to the left for write-in and to the right for read-out. It will be seen that the series of pulses applied to the utilization device will be in reverse order to those written in for the apparatus of FIGURE 1. For an identical order of pulses, the stress pulse may be applied to wire 10 for read-out at the end opposite the write in transducer, i.e., the right end in FIGURE 1. The reference pulses provide a reference position from which the stored number can be identified. The stored number can be read as often as desired simply by applying a torsional pulse to the wire 10 since the read-out is not destructive. The reference pulses are used here merely as illustrative and can possibly be eliminated by appropriate timing circuits, etc. in an actual computer installation.

In order to erase the stored number, it is merely necessary to send a current pulse through the wire 10 while no torsional stresses are in the wire.

FIGURE 2 illustrates a modification of FIGURE 1 where the current pulse source 21 is connected so as to energize a solenoid 25 which surrounds the wire 10, instead of transmitting the current pulse through the wire 10 directly. This modification operates similarly to that of FIGURE 1 in that after the torsion pulses are applied to the wire 10 the solenoid 25 is energized to "freeze" the pulses on the wire 10. Readout also is accomplished as in FIGURE 1, by applying a torsional pulse to the wire 10 and detecting the voltage pulses which appear across the wire 10.

Many changes can be made in the structure of the unit without departing from the spirit of the invention. Thus, the torsion transducer shown is merely illustrative and any suitable type may be substituted therefor. Also, the wire 10 is not necessarily of circular cross section but other shapes may be found suitable which might more specifically be described as tapes. As explained earlier, the read and write torsion transducers may be the same or separated ones. Other changes will be evident to those in the art, but the invention is pointed out in the appended claims.

We claim:

1. The method of producing a discrete region of locally-intensified magnetization in a predetermined portion of an elongated ferromagnetic member, comprising applying to one end of said member a torsional pulse about its axis of elongation for a time shorter than that required for said pulse to propagate through said member, and momentarily providing a magnetic field about said axis when said propagating torsional pulse has reached said portion of said member by passing a current pulse between the ends of said member.

2. In a device of the character described,
a ferromagnetic member,
means for applying a series of time-spaced torsional pulses to a portion of said member so that said pulses propagate in sequence along a predetermined path through said member, and
means for providing a momentary magnetic field about said path in said member while said series of pulses are propagating in respective regions in said member to alter the magnetization of said member selectively in said regions, said last-named means comprising means for passing an electric current through said path in said member.

3. In a device of the character described,
a ferromagnetic wire,
an electromechanical transducer connected to said wire for applying a torsional twist to one end of said wire,
a source of a timed sequence of electrical pulses representative of a unit of digital information, means for connecting said source to said transducer to produce in said wire a sequence of propagating torsional pulses corresponding to said sequence of electrical pulses, and
means for producing a momentary magnetic field around said wire while all of said torsional pulses are propagating therein to establish in said wire a plurality of spaced magnetized regions representative of said unit of digital information.

4. A device in accordance with claim 3, in which said last-named means comprises for passing an electrical current pulse through said wire while all of said torsional pulses are propagating therein.

5. A device in accordance with claim 3, comprising also means for applying a single torsional pulse to said wire after said magnetized regions are established, and means for detecting voltage pulses between the ends of said wire as said single pulse propagates successively through said magnetized regions.

References Cited by the Examiner

UNITED STATES PATENTS 3,127,578 3/64 Long -------------- 340—173 X

FOREIGN PATENTS 229,409 7/60 Australia.

OTHER REFERENCES

Pages 377–379, 1959, Publication I: Solid State Magnetic and Dielectric Devices.

IRVING L. SRAGOW, *Primary Examiner.*

JOHN F. BURNS, *Examiner.*